(No Model.)
R. J. GILLHAM.
COMBINED MEASURE AND FUNNEL.
No. 520,307. Patented May 22, 1894.
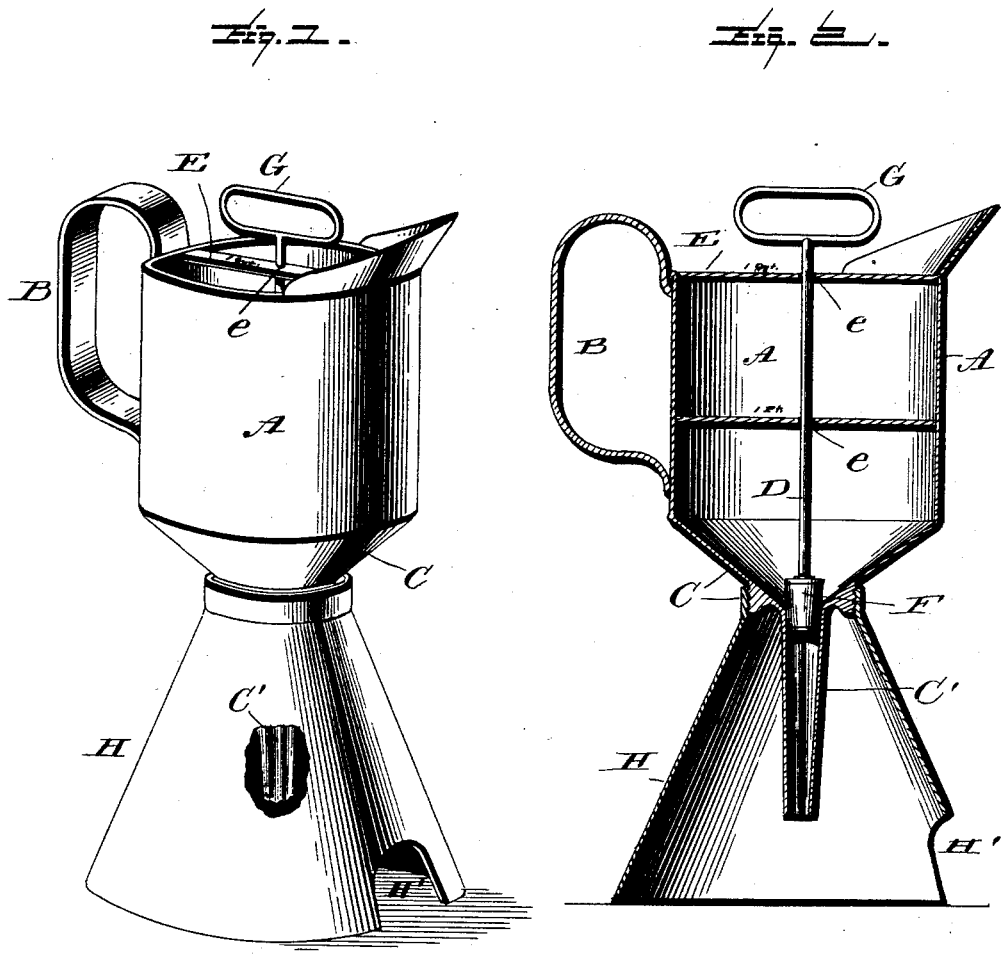
Witnesses:
L. C. Hills.
A. L. Hough
Inventor:
Robert J. Gillham
by
Franklin H. Hough
Attorney.

UNITED STATES PATENT OFFICE.

ROBERT J. GILLHAM, OF ORLANDO, FLORIDA.

COMBINED MEASURE AND FUNNEL.

SPECIFICATION forming part of Letters Patent No. 520,307, dated May 22, 1894.

Application filed December 22, 1893. Serial No. 494,372. (No model.)

*To all whom it may concern:*

Be it known that I, ROBERT J. GILLHAM, a citizen of the United States, residing at Orlando, in the county of Orange and State of Florida, have invented certain new and useful Improvements in a Combined Measure and Funnel; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in appliances for measuring liquids, and filling jugs, cans or bottles, and it has for its object to provide a simple and inexpensive device, comprising in combination, in a single article, a measure and funnel, the same being so constructed as to permit the measured liquid to run directly from the measure to the jug, bottle or other receptacle.

The invention has for a further object the providing of simple and effective means for controlling the flow of the liquid from the measure to the receptacle, as may be desired.

To these ends and to such others as the invention may pertain the same consists in the peculiar construction, and in the novel combination, arrangement and adaptation of parts, all as more fully hereinafter described, shown in the accompanying drawings, and then specifically defined in the appended claim.

The invention is clearly illustrated in the accompanying drawings, which, with the letters of reference marked thereon, form a part of this specification, and in which drawings—

Figure 1 is a perspective view of my improved measure and faucet, and Fig. 2, is a vertical, central section of the same.

Reference now being had to the details of the invention by letter, A designates the upper portion of the device which is preferably in the form of the usual liquid measures, being provided with the usual handle B. The bottom of the measure, instead of being flat, as is common, in the present instance is made in the form of a funnel, as shown at C, said funnel being provided with a contracted outlet tube C'. A plunger D vertically movable within openings e, e in the bars or strips E, E which extend across the interior of the measure, carries at its lower end a valve or plug F which plug, when the plunger is forced downward by means of the handle G at its upper end, will be seated within the outlet tube at the bottom of the measure, and thus prevent the liquid within the measure from passing through the funnel tube, as will be readily seen.

To provide a standard or base for the device, which will permit it to be placed upon a table shelf or other level surface, when not in use, I provide the portion H, which as shown, is in the form of an inverted funnel, having a notch H' formed in its lower edge, so as to permit the device to be readily applied to jugs or other receptacles having side handles.

The tube of the funnel should be corrugated so as to allow the air in the receptacle being filled, to escape. The bars E, E, which serve as braces and guides for the plunger, are also utilized as graduates to divide the measure off into pints, quarts, &c.

Having thus described my invention, what I claim to be new, and desire to secure by Letters Patent, is—

A combination measure and funnel consisting of the receptacle having the bars E, E, as described, which serve as guides for a plunger valve rod, as well as for graduating the said receptacle, and an inverted conical shaped base portion having a notch H' adapted to fit over the handle of a jug, substantially as shown and described.

In testimony whereof I affix my signature in presence of two witnesses.

ROBERT J. GILLHAM.

Witnesses:
WM. H. JEWELL,
S. E. IVES.